United States Patent [19]

Rosenberg et al.

[11] 4,351,671
[45] Sep. 28, 1982

[54] WATER REDUCING AGENT WITH REDUCED AIR

[75] Inventors: Arnold M. Rosenberg, Potomac; James M. Gaidis, Ellicott City; Lawrence J. Kindt, Woodbine, all of Md.

[73] Assignee: W. R. Grace & Co., New York, N.Y.

[21] Appl. No.: 254,235

[22] Filed: Apr. 15, 1981

[51] Int. Cl.$^3$ .............................................. C04B 7/35
[52] U.S. Cl. ...................................... 106/90; 106/314
[58] Field of Search ................... 106/90, 314, 315, 97, 106/98

[56] References Cited

U.S. PATENT DOCUMENTS 3,317,327  5/1967  Matsuda et al. ........................ 106/90
3,619,221  11/1971  Kossivas ............................... 106/90

Primary Examiner—James Poer
Attorney, Agent, or Firm—Howard J. Troffkin

[57] ABSTRACT

Additive, e.g., ethoxylated nonylphenol, for lignin type water-reducing agent in hydraulic cement compositions, reduces air entrainment in the concrete mix.

8 Claims, No Drawings

WATER REDUCING AGENT WITH REDUCED AIR

Lignin-type water-reducing agents are well known for use in preparing concrete mixes. Such agents serve to reduce the amount of water that would ordinarily be required to make a pourable mix, without however disturbing most of the other beneficial properties of the mix. On various occasions, however, the use of such water-reducing agents may entrain air into the mix. Entrained air (from any source) tends to reduce compressive strength. As a general rule, with every one volume percent air in the concrete, 5% of strength is lost. Thus, 5% air means about 25% strength loss.

EXAMPLE 1

(Preparation of water-reducing agent)

A water-reducing agent was prepared by mixing together the following materials:

| Component | Parts by Weight |
| --- | --- |
| Calcium lignosulfonate | 21.2 |
| Triethanolamine[1] | 9.6 |
| Formic acid | 0.9 |
| Formaldehyde | 2.8 |
| Corn syrup (polysaccharides) | 10.2 |
| Water | 55.3 |
| | 100.0 |

[1]Triethanolamine still bottoms is suitable.

Water reducing agents of this type are disclosed in U.S. Pat. No. 3,619,221, herein incorporated by reference in its entirety.

EXAMPLE 2

(Control)

A mortar mix was prepared by mixing together the following ingredients. The mixing apparatus consisted of Hobart mixer as described in ASTM specification C-305-65.

| Component | Grams |
| --- | --- |
| Hydraulic cement (Type I or II) | 350 |
| Sand | 1400 |
| Water-reducing agent solids[1] | 0.35 |
| Water | 255 |

[1]Of Example 1.

The mortar was examined for air entrainment as described in ASTM specification C-185-75. Entrained air was found to be 15 volume %.

EXAMPLE 3

(This invention)

Example 2 was repeated, except that 0.0144 g. of ethoxylated nonyl phenol was admixed into the water reducing agent (containing 0.35 g. of solids) prior to admixing the latter into the mortar mix. Air entrainment was measured at 11.0 volume %, a reduction of 26.7%.

The Water Reducing Agent

The water-reducing agent to which the ethoxylated alkyl phenol may be added with reduction of air entrainment was defined fairly specifically in Example 1. However, that formulation admits of considerable variation. Any water-reducing agent containing components within the following ranges is suitable for treatment in accordance with this invention.

| Component | Operable range, parts by weight |
| --- | --- |
| Lignosulfonate[1] | 15–25 |
| Triethanolamine[2] | 0–15 |
| Formic acid | 0–3 |
| Acetic acid | 0–3 |
| Formaldehyde | 0–4 |
| Saccharides[3] | 0–15 |
| Water | 40–70 |

[1]As the alkali metal or alkaline earth salt.
[2]As the commercially pure material or as triethanolamine still bottoms.
[3]Can be provided as corn syrup, dextrose, molasses, or the like.

Water reducing agents of this type are known as the lignin type, e.g., lignin WRA's, and this terminology may be used herein. As to range suitable for use in concrete, such lignin WRA's may be used in amounts in the range of 0.05 to 0.25 wt.% of the total weight of cement.

The Ethoxylated Alkyl Phenol

This material has the formula

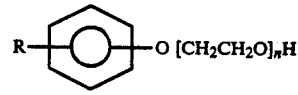

in which R is octyl or nonyl and n is 10 to 18 inclusive. These materials are available commercially as Renex 678; T-DET N-14; TRITON X-102, N-111, N-150; ARKOPAL N-130, N-150, etc.

This material is suitably added to the concrete mix at any time prior to the point at which substantial stirring is undertaken. Preferably it is added admixed with the WRA, or prior to the addition of the WRA. It is added in an amount which is 2 to 8 wt.% (preferably about 4%) based on the solids in the lignin-based WRA.

ASTM C185 Test

Additional tests were made, following the procedures of ASTM C185. Lignin WRA was used at the rate of 0.1% (solids) based on the cement, and ethoxylated nonyl phenol (14 moles ethylene oxide) at the rate of 4% of the WRA solids. Results follow. Air control and flow were superior (over the lignin WRA alone) for both types of cement.

| | | Flow, % | Air, % |
| --- | --- | --- | --- |
| Type I Cement | | | |
| no additive | | 86 | 7.0 |
| no additive | Air Contaminant | 100 | 10.0 |
| Lignin WRA of Example 1 | Air Contaminant | 122 | 13.0 |
| Lignin WRA of Example 1, with Ethoxylated nonyl phenol | Air Contaminant | 135 | 11.0 |
| Type II Cement | | | |
| no additive | | 90 | 10.0 |
| no additive | Air Contaminant | 113 | 14.0 |
| Lignin WRA of Example 1 | Air Contaminant | 127 | 15.0 |
| Lignin WRA of Example 1 with Ethoxylated nonyl phenol | Air Contaminant | 160 | 11.0 |

Other Additives

Other conventional additives can be used along with the materials of this invention, including, e.g., retarders, accelerators, anti-corrosion materials, additives for strength development, to modify bleeding characteristics.

Prior Art

U.S. Pat. No. 4,205,993 shows a lignin water-reducing agent. U.S. Pat. No. 4,116,706 (col. 16) shows that certain ethoxylated alkyl phenols entrain air at high rates in cement when used in set-accelerating compositions. U.S. Pat. No. 3,619,221 has already been mentioned.

We claim:

1. An additive composition for hydraulic cement consisting essentially of
   (a) a lignin-water-reducing agent and
   (b) 2 to 8 weight %, based on the lignin water-reducing agent, of

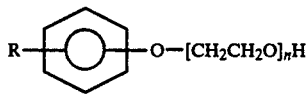

in which R is octyl or nonyl and n is 10 to 18.

2. Composition according to claim 1 in which the lignin water-reducing agent has the composition, in parts by weight:
   lignosulfonate 15–25, triethanolamine 0–15, formic acid 0–3, acetic acid 0–3, formaldehyde 0–4, saccharides 0–15, and water 40–70.

3. Composition according to claim 2 in which the lignin water-reducing agent has substantially the composition:

| Component | Parts by Weight |
| --- | --- |
| Calcium lignosulfonate | 21.2 |
| Triethanolamine | 9.6 |
| Formic acid | 0.9 |
| Formaldehyde | 2.8 |
| Corn syrup | 10.2 |
| Water | 55.3 |

4. Composition according to any of claims 1, 2, or 3 in which the ethoxylated alkyl phenol is nonyl phenol with 14 ethylene oxides.

5. In the process of preparing a cement or concrete mix consisting essentially of mixing together hydraulic cement, water, sand, aggregate in the case of concrete, with a lignin water-reducing agent, the improvement comprising adding to the mix an ethoxylated compound,

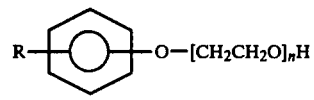

in which R is octyl or nonyl and n is 10 to 18, in an amount of 2 to 8 wt. % based on the solids of the water-reducing agent.

6. Process according to claim 4 in which the lignin water-reducing agent has the composition in parts by weight:
   lignosulfonate 15–25, triethanolamine 0–15, formic acid 0–3, acetic acid 0–3, formaldehyde 0–4, saccharides 0–15, and water 40–70.

7. Process according to claim 5 in which the lignin water-reducing agent has substantially the composition:

| Component | Parts by Weight |
| --- | --- |
| Calcium lignosulfonate | 21.2 |
| Triethanolamine | 9.6 |
| Formic acid | 0.9 |
| Formaldehyde | 2.8 |
| Corn syrup | 10.2 |
| Water | 55.3 |

8. Process according to any of claims 4, 5, or 6 in which the ethoxylated alkyl phenol is nonyl phenol with 14 ethylene oxides.

* * * * *

UNITED STATES PATENT AND TRADEMARK OFFICE
CERTIFICATE OF CORRECTION

PATENT NO. : 4,351,671
DATED : September 28, 1982
INVENTOR(S) : Arnold M. Rosenberg et al It is certified that error appears in the above-identified patent and that said Letters Patent are hereby corrected as shown below:

In claim 1, line 4, before "lignin" insert

-- solids of the --.

Signed and Sealed this

Seventeenth Day of May 1983

[SEAL]

*Attest:*

DONALD J. QUIGG

*Attesting Officer*     *Acting Commissioner of Patents and Trademarks*